US012482106B2

(12) United States Patent
Das et al.

(10) Patent No.: US 12,482,106 B2
(45) Date of Patent: Nov. 25, 2025

(54) METHOD AND ELECTRONIC DEVICE FOR SEGMENTING OBJECTS IN SCENE

(71) Applicant: SAMSUNG ELECTRONICS CO., LTD., Suwon-si (KR)

(72) Inventors: Biplab Chandra Das, Bangalore (IN); Kiran Nanjunda Iyer, Bangalore (IN); Shouvik Das, Kolkata (IN); Himadri Sekhar Bandyopadhyay, Kolkata (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 447 days.

(21) Appl. No.: 17/983,119

(22) Filed: Nov. 8, 2022

(65) Prior Publication Data

US 2023/0131589 A1    Apr. 27, 2023

Related U.S. Application Data

(63) Continuation of application No. PCT/KR2022/017489, filed on Nov. 8, 2022.

(30) Foreign Application Priority Data

Oct. 21, 2021  (IN) .............................. 202141051046
Nov. 8, 2021   (IN) .............................. 202141051046

(51) Int. Cl.
G06T 7/11    (2017.01)
G06T 7/73    (2017.01)
(Continued)

(52) U.S. Cl.
CPC ................. *G06T 7/11* (2017.01); *G06T 7/73* (2017.01); *G06V 10/7715* (2022.01);
(Continued)

(58) Field of Classification Search
USPC ......................................................... 382/156
See application file for complete search history.

(56) References Cited

U.S. PATENT DOCUMENTS 10,671,855 B2    6/2020  Lee et al.
10,713,794 B1    7/2020  He et al.
(Continued)

FOREIGN PATENT DOCUMENTS

KR    10-2117050 B1    5/2020
WO    WO-2022182265 A1 *  9/2022   ........... G06N 3/0455

OTHER PUBLICATIONS

Communication dated Nov. 12, 2024, issued by the European Patent Office in European Application No. 22890494.2.
(Continued)

*Primary Examiner* — Chineyere Wills-Burns
*Assistant Examiner* — Aaron Timothy Bonansinga
(74) *Attorney, Agent, or Firm* — Sughrue Mion, PLLC

(57) ABSTRACT

A method for segmenting objects in a scene by an electronic device is provided. The method includes inputting at least one input frame of the scene into a pre-trained neural network model, the scene including a plurality of objects; determining a position and a shape of each object of the plurality of objects in the scene using the pre-trained neural network model; determining an array of coefficients for pixels associated with each object of the plurality of objects in the scene using the pre-trained neural network model; and generating a segment mask for each object of the plurality of objects based on the position, the shape, and the array of coefficients for each object of the plurality of objects in the scene.

18 Claims, 16 Drawing Sheets

(51) Int. Cl.
    *G06V 10/77* (2022.01)
    *G06V 10/80* (2022.01)
    *G06V 10/82* (2022.01)
    *G06V 20/70* (2022.01)

(52) U.S. Cl.
    CPC ............ *G06V 10/806* (2022.01); *G06V 10/82* (2022.01); *G06V 20/70* (2022.01); *G06T 2207/20016* (2013.01); *G06T 2207/20084* (2013.01)

(56) References Cited

U.S. PATENT DOCUMENTS

| | | | |
|---|---|---|---|
| 10,937,169 | B2 | 3/2021 | Dharur et al. |
| 11,127,139 | B2 | 9/2021 | Zhang et al. |
| 2011/0044536 | A1* | 2/2011 | Cobb .................. G06V 10/507 382/165 |
| 2017/0213112 | A1* | 7/2017 | Sachs .................... G06N 3/045 |
| 2019/0080457 | A1 | 3/2019 | Shukla et al. |
| 2019/0108414 | A1 | 4/2019 | Price et al. |
| 2019/0145765 | A1* | 5/2019 | Luo ..................... G06V 10/764 702/153 |
| 2019/0313986 | A1 | 10/2019 | Do |
| 2020/0193609 | A1* | 6/2020 | Dharur .................... G06T 7/143 |
| 2020/0302239 | A1 | 9/2020 | Wang |
| 2020/0320748 | A1 | 10/2020 | Levinshtein et al. |
| 2021/0012116 | A1* | 1/2021 | Urtasun ............. G06F 18/2155 |
| 2021/0026355 | A1* | 1/2021 | Chen ........................ G01S 17/89 |
| 2021/0062653 | A1* | 3/2021 | Zeng ....................... E21C 39/00 |
| 2021/0248748 | A1 | 8/2021 | Turgutlu et al. |
| 2021/0256254 | A1* | 8/2021 | Takahashi ............... G06F 18/22 |
| 2021/0295555 | A1 | 9/2021 | Ayvaci et al. |
| 2021/0342608 | A1 | 11/2021 | Smolyanskiy et al. |
| 2021/0370993 | A1* | 12/2021 | Qian ..................... B61L 23/042 |
| 2022/0092869 | A1* | 3/2022 | Abbeloos ............. G06V 10/762 |
| 2022/0138511 | A1* | 5/2022 | Xu ........................ G06N 3/082 706/15 |
| 2022/0292291 | A1 | 9/2022 | Berman et al. |

OTHER PUBLICATIONS

Henghui et al., "Semantic Correlation Promoted Shape-Variant Context for Segmentation", 2019 IEEE/CVF Conference on Computer Vision and Pattern Recognition (CVPR), XP033687102, Jun. 15, 2019, pp. 8877-8886 (10 pages total).

Communication dated Mar. 4, 2024, issued by the Indian Patent Office in Indian Patent Application No. 202141051046.

International Search Report and Written Opinion (PCT/ISA/220, PCT/ISA/210, and PCT/ISA/237) dated Feb. 16, 2023, issued by International Searching Authority in International Application No. PCT/KR2022/017489.

Ke et al., "Deep Occlusion-Aware Instance Segmentation with Overlapping BiLayers", 2021 IEEE/CVF Conference on Computer Vision and Pattern Recognition (CVPR), Jun. 25, 2021, pp. 4018-4027 (12 total pages), CVPR 2021.

Liu, "Single Stage Instance Segmentation—A Review," Published in Towards Data Science, Apr. 28, 2020, Retrieved from https://towardsdatascience.com/single-stage-instance-segmentation-a-review-1eeb66e0cc49, Total 21 pages.

He et al., "Mask R-CNN," arXiv:1703.06870v3 [cs.CV], Jan. 24, 2018, Total 12 pages.

Bolya et al., "YOLACT Real-time Instance Segmentation," arXiv:1904.02689v2 [cs.CV], Oct. 24, 2019, Total 11 pages.

Wang et al., "CenterMask: single shot instance segmentation with point representation," arXiv:2004.04446v2 [cs.CV], Apr. 11, 2020, Total 9 pages.

Cao et al., "SipMask: Spatial Information Preservation for Fast Image and Video Instance Segmentation," arXiv:2007.14772v1 [cs.CV], Jul. 29, 2020, Total 17 pages.

Wang et al., "SOLO: Segmenting Objects by Locations," arXiv:1912.04488v3 [cs.CV], Jul. 19, 2020, Total 19 pages.

Cheng et al., "Panoptic-DeepLab: A Simple, Strong, and Fast Baseline for Bottom-Up Panoptic Segmentation," arXiv:1911.10194v3 [cs.CV], Mar. 11, 2020, Total 16 pages.

* cited by examiner

METHOD AND ELECTRONIC DEVICE FOR SEGMENTING OBJECTS IN SCENE

CROSS-REFERENCE TO RELATED APPLICATIONS

This application is a by-pass continuation application of International Application No PCT/KR2022/017489, filed on Nov. 8, 2022, which is based on and claims priority to Indian Complete patent application No. 202141051046, filed on Oct. 21, 2022, and Indian Provisional Patent Application No. 202141051046, filed on Nov. 8, 2021, in the Indian Patent Office, the disclosures of which are incorporated by reference herein in their entireties.

BACKGROUND

1. Field

The disclosure relates to object instance segmentation methods, and more specifically, to a method and an electronic device for segmenting objects in a scene.

2. Description of Related Art

In general, real-time mobile object instance segmentation requires lightweight deep neural network architecture and intelligent combination of network outputs to produce good-quality object instance segmentation masks. However, existing methods perform the real-time mobile object instance segmentation using a cascade network or a two-stage network, which makes a task/process computationally expensive. For overlapping objects, segregating the objects intelligently and producing good-quality segmentation masks for each of object is crucial for certain scenarios, for example, a person holding a pet.

Further, some existing methods use computation heavy blocks to produce good-quality instance segmentation masks, which makes their usage in implementation in real-time solutions in mobile devices impractical.

FIG. 1 is an example scenario 100 in which a two-stage network issue is illustrated, according to the related art. As shown in FIG. 1, the two-stage networks first crop out regions of interest in the image and then segment the regions in the image and resize them back to image resolution. This leads to bad boundaries (denoted by circled areas in FIG. 1) and higher execution time based on higher number of instances.

FIG. 2 is an example scenario 200 in which an overlapping object problem is depicted, according to the related art. As shown in FIG. 2, an output is from the two-stage network (e.g., a Mask-recurrent convolutional neural network (RCNN) Network or the like). As the user can see, for scenario where person is holding a cat, the network completely misses the cat and only segments upper part of a person. This will lead to a negative user experience for solutions targeted to beautification of the scene based on object instance segmentation.

Thus, it is desired to address the above-mentioned disadvantages or other shortcomings or at least provide a useful alternative.

SUMMARY

According to an aspect of the disclosure, a method for segmenting objects in a scene by an electronic device, includes: inputting at least one input frame of the scene into a pre-trained neural network model, the scene including a plurality of objects; determining a position and a shape of each object of the plurality of objects in the scene using the pre-trained neural network model; determining an array of coefficients for pixels associated with each object of the plurality of objects in the scene using the pre-trained neural network model; and generating a segment mask for each object of the plurality of objects based on the position, the shape, and the array of coefficients for each object of the plurality of objects in the scene.

The method further may include displaying the segment mask for each object in the scene that segments overlapping objects of the plurality of objects in the scene.

The determining the position of each object of the plurality of objects in the scene using the pre-trained neural network model may include: generating a center map using the pre-trained neural network model, wherein the center map includes N channels that corresponds to a number of semantic categories representing each object in the scene; and determining the position of each object of the plurality of objects in the scene based on the center map.

The generating the center map may include: inputting the at least one input frame of the scene to the pre-trained neural network model and obtaining an N channel feature map as an output from the pre-trained neural network model, wherein N corresponds to a number of semantic categories that are supported; and obtaining the center map by predicting, based on the N channel feature map, center positions of each object of the plurality of objects in the at least one input frame input to the pre-trained neural network model.

The predicting the center positions of each object of the plurality of objects may include locating a local maxima by suppressing local minimum areas and capturing only local maximums for each channel of the N channel feature map, wherein the location of the local maxima in each channel of the N channel feature map corresponds to centroid positions of the plurality of objects of that semantic category forming the center map.

The determining the position of each object of the plurality of objects in the scene from the center map may include: reshaping the at least one input frame by pre-processing the at least one input frame based on neural network input parameters, wherein the neural network input parameters include at least one of a channel dimension of input frame, a spatial resolution of input frame, and processing details; inputting the reshaped at least one input frame into a pyramidal based neural network model to generate a set of features from pyramid levels; combining the set of features from the pyramid levels to form aggregated features; passing the aggregated features through a center mask to generate semantically aware center map of shape of each object of the plurality of objects in the scene; and determining, based on the semantically aware center map, the position of each object of the plurality of objects in the scene by encoding a confidence of each position having a center of an object for each semantic category of the semantic categories.

The determining the shape of each object of the plurality of objects in the scene using the pre-trained neural network model may include: generating a prototype map using the pre-trained neural network model, wherein the prototype map produces a fixed number of object shape aware feature maps, which act as prototypes for final object instances; and determining the position of each object of the plurality of objects in the scene from the prototype map.

The determining the position of each object of the plurality of objects in the scene from the prototype map may include: reshaping by pre-processing the at least one input frame based on neural network input parameters; inputting the reshaped at least one input frame into a pyramidal based neural network model to generate a set of features from pyramid levels; combining, the set of features from the pyramid levels to form aggregated features; and determining the position of each object of the plurality of objects in the scene by passing the aggregated features through a prototype mask to generate a plurality of shape aware prototype masks for each center in the at least one input frame.

The determining the array of coefficients for pixels associated with each object of the plurality of objects in the scene using the pre-trained neural network model may include: determining a first array of coefficients for a first object of the plurality of objects in the scene; and determining a second array of coefficients for a second object of the plurality of objects in the scene.

The inputting the at least one input frame of the scene into the pre-trained neural network model may include: displaying the scene in a preview field of at least one imaging sensor of the electronic device; obtaining the at least one input frame of the scene using the at least one imaging sensor; and inputting the at least one input frame of the scene into the pre-trained neural network model.

The generating the segment mask for each object of the plurality of objects may include: obtaining semantically aware center maps and shape aware prototype masks associated with each object of the plurality of objects in the scene; determining a linear combination of the semantically aware center maps and the shape aware prototype masks weighted by corresponding coefficients of the array of coefficients on each center location; and generating the segment mask for each object of the plurality of objects based on the linear combination of the semantically aware center maps and the shape aware prototype masks.

According to an aspect of the disclosure, an electronic device for segmenting objects in a scene, includes: a memory; a display; an object segment controller communicatively coupled to the memory; and a processor configured to: input at least one input frame of the scene into a pre-trained neural network model, the scene including a plurality of objects; determine a position and a shape of each object of the plurality of objects in the scene using the pre-trained neural network model; determine an array of coefficients for pixels associated with each object of the plurality of objects in the scene using the pre-trained neural network model; and generate a segment mask for each object of the plurality of objects based on the position, the shape, and the array of coefficients for each object of the plurality of objects in the scene.

The object segment controller may be configured to display on the display the generated segment mask for each object in the scene that segments overlapping objects of the plurality of objects in the scene.

The processor may be further configured to: generate a center map using the pre-trained neural network model, wherein the center map may include N channels that corresponds to a number of semantic categories representing each object in the scene; and determine the position of each object of the plurality of objects in the scene based on the center map.

The processor may be further configured to: input the at least one input frame of the scene to the pre-trained neural network model and obtaining an N channel feature map as an output from the pre-trained neural network model, wherein N corresponds to a number of semantic categories that are supported; and obtain the center map by predicting center positions of each object of the plurality of objects in the at least one input frame input to the pre-trained neural network model based on the N channel feature map.

The processor may be further configured to predict the center positions of each object of the plurality of objects by locating a local maxima by suppressing local minimum areas and capturing only local maximums for each channel of the N channel feature map, wherein the location of the local maxima in each channel of the N channel feature map corresponds to centroid positions of the plurality of objects of that semantic category forming the center map.

The processor may be further configured to: reshape the at least one input frame by pre-processing the at least one input frame based on neural network input parameters, wherein the neural network input parameters include at least one of a channel dimension of input frame, a spatial resolution of input frame, and processing details; input the reshaped at least one input frame into a pyramidal based neural network model to generate a set of features from various pyramid levels; combine the set of features from the various pyramid levels to form aggregated features; pass the aggregated features through a center mask to generate semantically aware center map of shape of each object of the plurality of objects in the scene; and determine the position of each object of the plurality of objects in the scene by encoding a confidence of each position having a center of an object for each semantic category of the number of semantic categories based on the center map.

The processor may be further configured to: generate a prototype map using the pre-trained neural network model, wherein the prototype map produces a fixed number of object shape aware feature maps, which act as prototypes for final object instances; and determine the position of each object of the plurality of objects in the scene from the prototype map.

The processor may be further configured to: reshape by pre-processing the at least one input frame based on neural network input parameters; input the reshaped at least one input frame into a pyramidal based neural network model to generate a set of features from various pyramid levels; combine the set of features from the various pyramid levels to form aggregated features; and determine the position of each object of the plurality of objects in the scene by passing the aggregated features through a prototype mask to generate shape aware prototype masks for each center in the at least one input frame.

The processor may be further configured to: determine a first array of coefficients for a first object of the plurality of objects in the scene; and determine a second array of coefficients for a second object of the plurality of objects in the scene.

The electronic device may further include at least one imaging sensor, and the processor may be further configured to: display on the display the scene in a preview field of the at least one imaging sensor; obtain the at least one input frame of the scene using the at least one imaging sensor of the electronic device; and input the at least one input frame of the scene into the pre-trained neural network model.

The processor may be further configured to: obtain semantically aware center maps and shape aware prototype masks associated with each object of the plurality of objects in the scene; determine a linear combination of the semantically aware center maps and the shape aware prototype masks weighted by corresponding coefficients of the array of coefficients on each center location; and generate the segment mask for each object of the plurality of objects based on the linear combination of the semantically aware center maps and the shape aware prototype masks.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
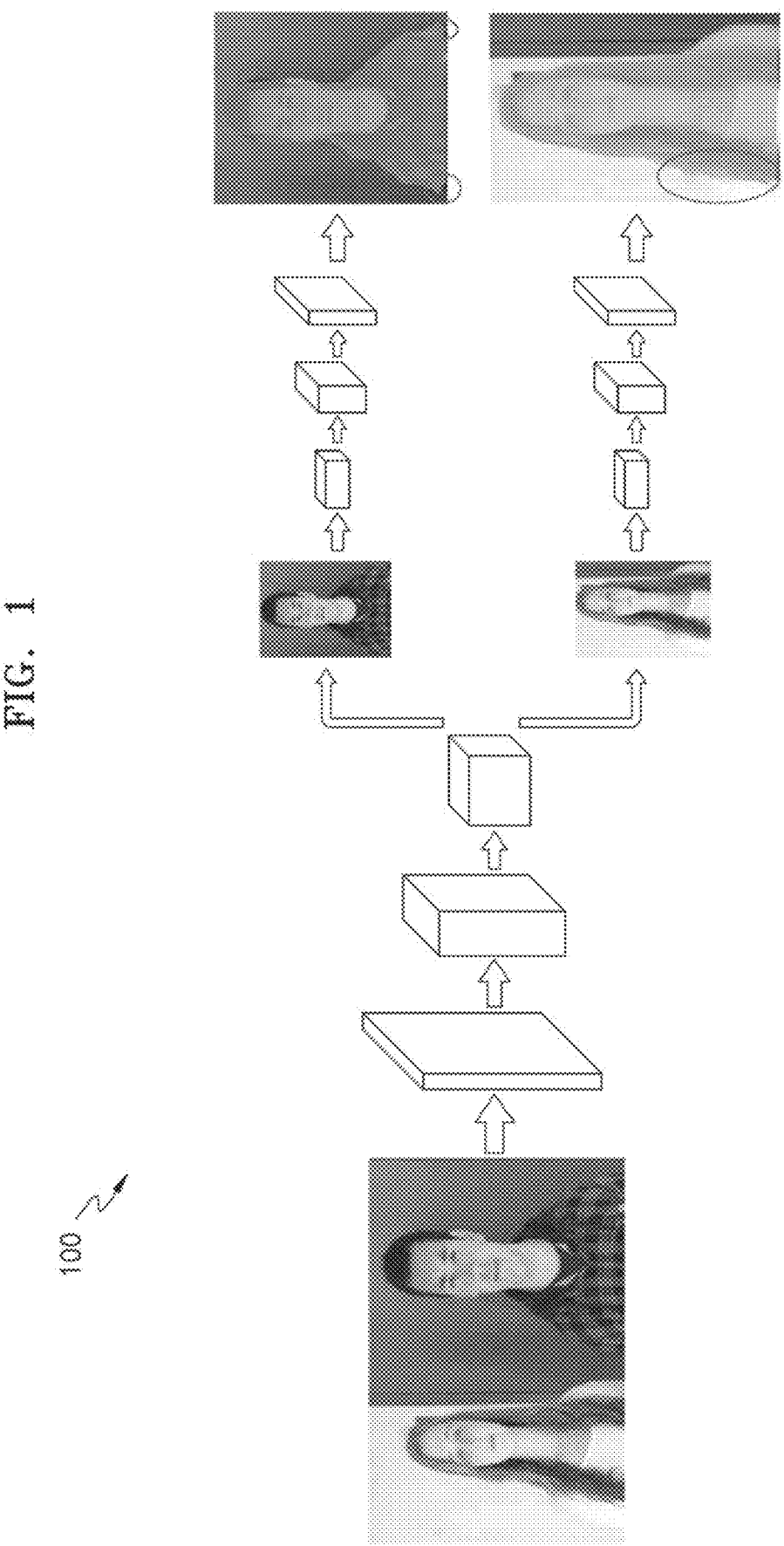
FIG. 1 is an example scenario in which a two-stage network issue is depicted, according to the related art.
Figure 2:
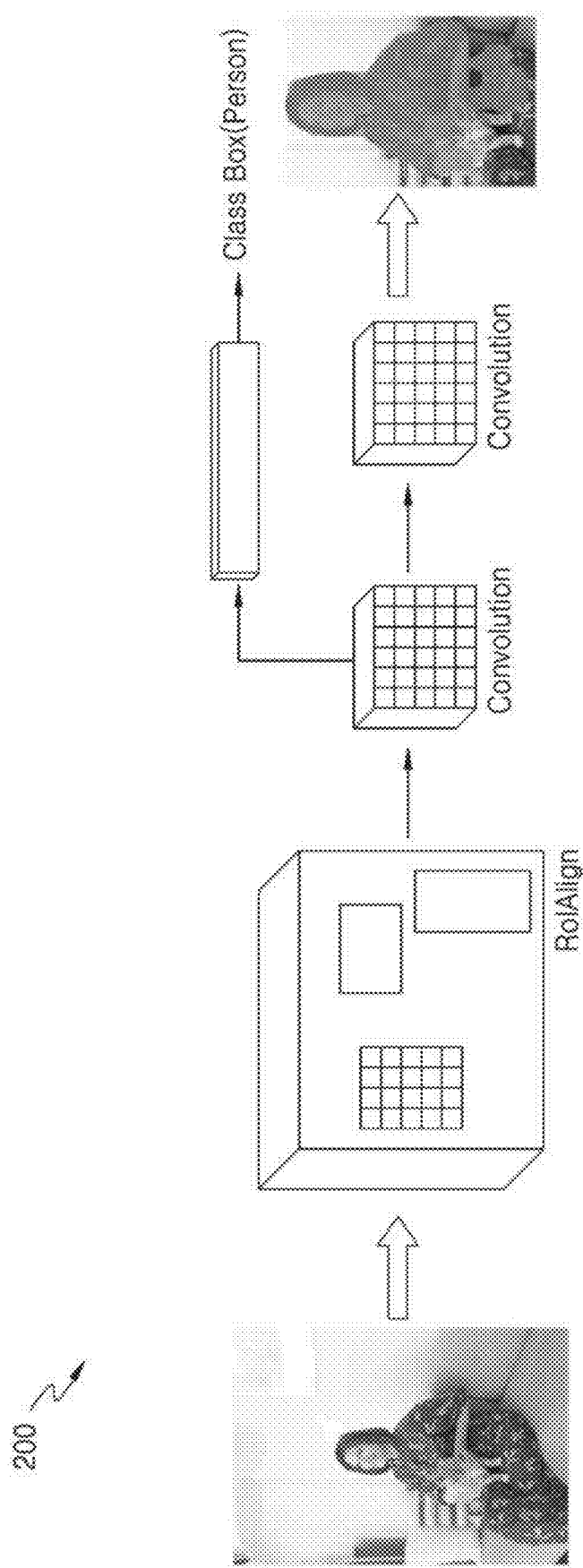
FIG. 2 is an example scenario in which an overlapping object problem is depicted, according to the related art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In the disclosure, the term "image" refers to the digital image describing graphical representation of the objects in scene. The digital image uses pixels, or, picture elements with finite, discrete numeric valued vectors for intensity representation at those pixel locations. Digital images can be represented in various form, but for our analysis purpose, we consider digital image to be three channel images represented using RGB color model. Also, in an embodiment, this term refers to individual frames of a video stream.

In the disclosure, the term "segmentation" refers to the process of partitioning digital image into different regions based on related groups of pixels. In an embodiment, segmentation refers to the partitioning of image based on semantic content, for example, Person, Cat and Dog. Also, in an embodiment, segmentation of object instances is considered, which means, area covered by Person 1 and Person 2 is segmented separately.

In the disclosure, the term "mask" refers to the assignment of integer values to the individual segments of the digital image. In an embodiment, the pixel intensity values of background are set to zero, while the intensity values of different foreground segments are assigned distinct integer values starting from 1.

In the disclosure, the term "semantic segmentation" refers to the process of labelling each pixels of an image with a corresponding category to which those particular pixels belong to. For example, the categories in semantic segmentation can be either of hair, skin, person, pet, animal, sky, building, grass, greenery, road, mountain, water etc.

In the disclosure, the term "instance segmentation" refers to the process of detecting and segregating each instances of an object in an image. For example, the object instances in instance segmentation can be person 1, person 2, animal 1, vehicle 1, vehicle 2 etc. So, for each of these distinct instances of objects present in the image, distinct labelling is applied.

In the disclosure, the term "neural network" or "neural network model" refers to the networks implemented in computer, which are trained with specific objectives. In an embodiment, the neural network is a convolutional neural network that is trained to produce segmentation data for an image. By training, it is meant that the network takes as input multiple pair of input image, and their segmentation mask, and tries to produce same segmentation mask in an iterative process.

According to an embodiment, a method for segmenting objects in a scene by an electronic device is provided. The method includes feeding, by the electronic device, at least one input frame of the scene comprising a plurality of objects into a neural network model. Further, the method includes determining, by the electronic device, a position and a shape of each object of the plurality of objects in the scene using the pre-trained neural network model. Further, the method includes determining, by the electronic device, an array of coefficients for pixels associated with each object of the plurality of objects in the scene using the pre-trained neural network model. Further, the method includes generating, by the electronic device, a segment mask for each object of the plurality of objects based on the position, the shape and the array of coefficients for each object of the plurality of objects in the scene.

The method may be used to generate a semantic aware position information and approximate shape information of objects present in the scene from a deep neural network and combine the position and shape information intelligently to produce good quality real-time instance segmentation of objects present in the scene with less computation power and accurate, while maintaining power and memory consumption in the electronic device. The module may be able to distinguish objects with sufficient overlap in the scene.

The method may be used to provide a light weight instance segmentation with improved demarcation. The method may be used to achieve high quality segmentation for overlapping objects in a scene. The instance segmentation refers to the task of identifying the separate instances of a particular object, say, human or pet, present in the image and produce the segmentation masks for each of them. In addition to segmentation of separate instances, it is expected to have the semantic category information of the particular object instance in consideration.

The method may be used to avoid computation intensive two stage pipelines, and has low latency. The proposed method may be implemented in various modes (e.g., Portrait mode, Live Focus, Selective focus, Video Object segmentation mode or the like) of the electronic device.

The proposed method may be able to distinguish overlapping objects with very good boundary quality. The method may also identify each instance of objects (e.g., Pets and Person in the scene or the like) and provide a greater flexibility across use cases like portrait mode and live focus (for example).

Referring now to the drawings and more particularly to FIGS. 3 through 12, where similar reference characters denote corresponding features consistently throughout the figures, there are shown example embodiments.

Figure 3:
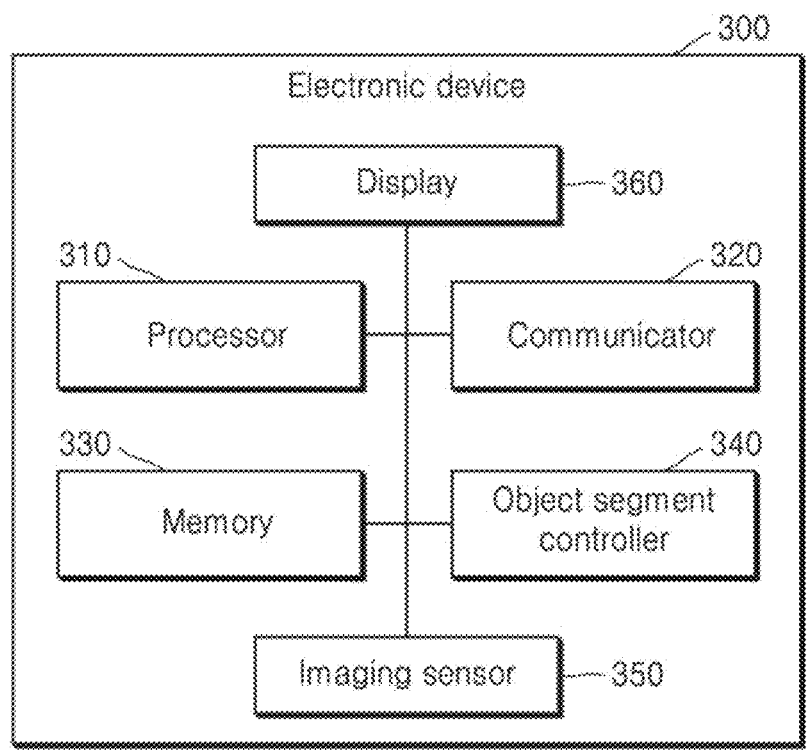
FIG. 3 shows various hardware components of an electronic device, according to an embodiment.

FIG. 3 shows a block diagram of an electronic device 300), according to embodiments. The electronic device 300) can be, for example, but not limited to a cellular phone, a smart phone, a Personal Digital Assistant (PDA), a tablet computer, a laptop computer, an Internet of Things (IoT), embedded systems, edge devices, a vehicle to everything (V2X) device or the like. In an embodiment, the electronic device 300 includes a processor 310, a communicator 320, a memory 330, an object segment controller 340 and an imaging sensor 350. The processor 310 is coupled with the communicator 320, the memory 330, the object segment controller 340, the imaging sensor 350, and a display 360.

The object segment controller 340 feeds at least one input frame of a scene comprising a plurality of objects into a neural network model. In an embodiment, the object segment controller 340 displays the scene in a preview field of at least one imaging sensor 350 of the electronic device 300. Using the at least one imaging sensor 350, the object segment controller 340 captures the at least one input frame of the scene. Further, the object segment controller 340 feeds the at least one input frame of the scene comprising the plurality of objects into the pre-trained neural network model.

Further, the object segment controller 340 determines a position and a shape of each object of the plurality of objects in the scene using the pre-trained neural network model. In an embodiment, the object segment controller 340 generates a center map using the pre-trained neural network model. The center map includes N number of channels that corresponds to a number of semantic categories representing each object in the scene. The object segment controller 340 determines the position of each object of the plurality of objects in the scene from the center map. The center map is generated by inputting the at least one input frame of the scene to the pre-trained neural network model and obtaining an N channel feature map as an output from the pre-trained neural network model. The number N corresponds to a number of semantic categories supported and obtaining the center map by predicting center positions of each object of the plurality of objects in the at least one input frame input to the pre-trained neural network model based on the N channel feature map. The center position of each object of the plurality of objects is predicted by locating a local maxima by suppressing local minimum areas and capturing only local maximums for each channel of the N channel feature map, wherein the location of the local maxima in each channel of the N channel feature map corresponds to centroid positions of the plurality of objects of that semantic category forming the center map.

In an example, the neural network takes an input frame as input obtained via the electronic device 300, and predicts an N channel feature map that will predict center positions of the objects in the input frame (N corresponds to the number of semantic categories supported). For each channel of the feature map, the local maxima of values are located by using non-maximum suppression of the feature values. The location of the maxima of feature in each channel corresponds to the centroid positions of objects of that semantic category. Repeating this process for N channels generates the N channel center map, where the predicted centers refer to the predicted centroids of objects of corresponding semantic category in each channel.

In another embodiment, the object segment controller 340 reshapes the at least one input frame by pre-processing the at least one input frame based on neural network input parameters, wherein the neural network input parameters comprise at least one of a channel dimension of input frame, a spatial resolution of input frame, and processing details.

In an example, the channel dimension of input frame means some neural networks use an input grayscale image as input (1 channel), while some neural networks use a BGR image as input (3 channel), while some neural networks use multiple image frames, e.g. 2 input BGR frames, thus having 6 channel input. In an example, spatial resolution of input frame means based on desired complexity of networks, the neural networks are designed to work with large or small size input frames, and hence the size of input frame is fixed for a particular network. In an example, the pre-processing details means generally the neural networks employ standardization techniques to normalize the input frame intensity values, and this needs to be specified for neural networks. For example, for the BGR image has pixel intensities in the range (0, 255), and the values are subtracted by 128 and divided by 128 to bring the input in the range (−1, 1), which is then passed to the neural network.

Further, the object segment controller 340 feeds the reshaped at least one input frame into a pyramidal based neural network model to generate a set of features from various pyramid levels. In an example, the neural network takes as input frame captured by the electronic device 300, and generates set of features from different pyramid levels. These features are, in particular, activation maps from different layers of neural network. The neural networks consists of stack of convolution filter blocks, which takes as input a tensor representing input image and each filter block performs some linear/non-liner operations on the input and produces some output tensor, which is then fed into next filter block. These features do not represent any physical or meaningful features, rather they represent different set of output tensors of different shape from different internal layers of the neural network. Alternatively, the neural network takes the input frame as the input captured by the electronic device 300, and generates set of features from different pyramid levels. Here, a neural network is stack or sequential setup of several small linear and non-linear operations to produce desired output. These linear and non-linear operations are, generally repeated in a set of blocks. In each of these blocks, the input shape of the feature map (generated at that step from the neural network) is reduced. Thus, these blocks act as pyramids where the shape of feature at each pyramid decreases at each level of the pyramid. The first level of pyramid takes input image and predicts a feature map by doing some linear/non-linear operations, whose size is halved of the input image size. Second level of pyramid takes this feature map as input and again performs some linear/non-linear operations, thus generating another feature map output, which again has half of input size. Thus, at each level of pyramid, the output size decreases, while the features output of each level are different from previous layer features. For example, the outputs at initial layers of the pyramid are basic image features like edges, corners, etc., while outputs at later layers of the pyramid are more detailed image features like person shapes, flower shapes, etc.

Further, the object segment controller 340 combines the set of features from the various pyramid levels to form aggregated features. Further, the object segment controller 340 passes the aggregated features through the center mask to generate semantically aware center map of shape of each object of the plurality of objects in the scene. Further, the object segment controller 340 determines the position of each object of the plurality of objects in the scene by encoding a confidence of each position having a center of an object for each semantic category of the number of semantic categories based on the center map. The center map is generated from the predicted output map by suppressing local minimum areas, and only capturing local maximums whose values are higher than sufficient threshold. Now, once, the user of the electronic device 300 accesses the possible centers of objects using this process, the values of output map at those center locations provide the confidence associated with the predicted center locations.

In an embodiment, the object segment controller 340 generates a prototype map using the pre-trained neural network model, wherein the prototype map produces a fixed number of object shape aware feature maps, which act as prototypes for final object instances.

In an example, the neural network takes the image frame as input, captured by the electronic device 300. The image tensor is passed through the neural network to produce three outputs as indicated below:

1. Center map: this is an output tensor, which the user of the electronic device 300 name as center map, because this tensor produces the potential center locations after processing as mentioned above.

2. Prototype map: this is another output tensor, which user of the electronic device 300 name as prototype map, because this tensor produces fixed number of object shape aware feature maps, which act as prototypes for the final object instances. Different weightage-based combination of these feature maps result in different instances predicted.

3. Coefficient map: this is final output tensor from network, which user of the electronic device 300 name as coefficient map, because this tensor gives the coefficients for combination of prototype tensors predicted from b. Here, for each center predicted from center map, user of the electronic device 300 obtain the location of the center map and then use that location from the coefficient map to get the coefficient vector. This coefficient vector multiplied with the prototype tensor produces the instance outputs.

Further, the object segment controller 340 reshapes the at least one input frame by pre-processing the at least one input frame based on the neural network input parameters. Further, the object segment controller 340 feeds the reshaped at least one input frame into a pyramidal based neural network model to generate a set of features from various pyramid levels. Further, the object segment controller 340 combines the set of features from the various pyramid levels to form aggregated features. Further, the object segment controller 340 determines the position of each object of the plurality of objects in the scene by passing the aggregated features through the prototype mask to generate a plurality of shape aware prototype masks for each center in the at least one input frame.

Further, the object segment controller 340 determines an array of coefficients for pixels associated with each object of the plurality of objects in the scene using the pre-trained neural network model. In an embodiment, the object segment controller 340 determines a first array of coefficients for a first object of the plurality of objects in the scene. The object segment controller 340 determines a second array of coefficients for a second object of the plurality of objects in the scene.

Further, the object segment controller 340 generates a segment mask for each object of the plurality of objects based on the position, the shape and the array of coefficients for each object of the plurality of objects in the scene. In an embodiment, the object segment controller 340 obtains semantically aware center maps and shape aware prototype masks associated with each object of the plurality of objects in the scene. Further, the object segment controller 340 determines a linear combination of the semantically aware center maps and the shape aware prototype masks weighted by corresponding coefficients of the array of coefficients on each center location. Further, the object segment controller 340 generates the segment mask for each object of the plurality of objects based on the linear combination of the semantically aware center maps and the shape aware prototype masks. Further, the object segment controller 340 displays the generated segment mask for each object in the scene that segments overlapping objects of the plurality of objects in the scene.

In an example, the input image frame is captured by the electronic device 300 and the captured image is pre-processed based on neural network input parameters (as discussed above) to generate a tensor that is fed to the deep neural network. The deep neural network takes as input the pre-processed tensor, and passes the tensor through several layers of pyramidal convolution filter blocks. The neural network combines the feature output at each of the pyramid blocks, and performs some convolution filter-based operations on these features to output from the network three feature blocks, namely: center map, coefficient map and feature maps. The output feature map named center map is first processed to find the probable object center locations. The local maxima of this map is extracted and those maximum output regions are located as the center of the objects present in the scene. The values of the feature map at those regions are the confidence of the object centers predicted. For example, let us assume, the user of the electronic device 300 obtain K center map corresponding to K possible objects in the scene following this process. The values of this map at those locations also provide us the confidence of those predicted K centers. Next, the electronic device 300 process the coefficient map output based on these previous center map locations predicted. For each of the center location (x, y), the electronic device 300 obtains the values at those location of the coefficient map, which gives the coefficient vector, that will be used in next step to combine the prototype tensors to produce the instance map. Finally, the prototype map output contains object instance shape aware feature maps that contain the information of individual object instances. Now, the coefficient vector produced at previous step for one particular center location is multiplied with the prototype tensors to generate the object instance map corresponding to the object instance whose center is used for calculation. Repeating the above steps for each of the K center locations predicted, give us the object instance map for each of the K objects in the input frame.

In another example (in other words), the step-by-step operations for segmenting objects in the scene are as follows:

1. Using the preview camera of the electronic device 300 (e.g., mobile device or the like), the individual frames of the input video stream are captured and processed as RGB images.
2. Received RGB images are pre-processed according to predefined neural network input parameters, and reshaped to (H,W).
3. The pre-processed image is fed into a pyramidal based neural networks for generating a set of features.
4. The features from various pyramid levels are combined to form an aggregate of features.
5. The aggregate of features in step 4, is passed through a center mask prediction head. The center mask prediction head generates a semantically aware center map of shape (H/16.W/16,N), where N is the number of semantic classes. The center map encodes the confidence of each position containing the center of an object for each semantic category (across the channels).
6. The aggregate of features in step 4, is passed through prototype mask prediction head, which generates K shape aware prototypes for each center in the image.
7. The aggregate of features in step 4, is passed through coefficient prediction head, to generate K coefficient one for each prototype representing the weightage of each prototype for a particular object.
8. The center mask predicted in step 5 is thresholded, such that only confident centers remain.
9. Perform non maximal suppression along each channels independently on an M×M neighborhood to retain most confident centers.
10. Step 9 generates a list of confident centers along with their semantic classes (represented independently by the channels).
11. For the retained centers, generate object score mask by linearly combining the prototypes weighted by the coefficients on each center location.
12. Take a sigmoid of the object score mask to generate an object mask. (The semantic label of the generated mask is based on the channel corresponding to the center it is derived from).
13. Merge the predicted maps object from each channel in a post processing step to obtain semantic object mask for each instance in the image.

The object segment controller 340 is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor 310 is configured to execute instructions stored in the memory 330 and to perform various processes. The communicator 320 is configured for communicating internally between internal hardware components and with external devices via one or more networks. The memory 330 also stores instructions to be executed by the processor 310. The memory 330 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 330 may, in some examples, be considered a non-transitory storage medium. The term "non-transitory" may indicate that the storage medium is not embodied in a carrier wave or a propagated signal. However, the term "non-transitory" should not be interpreted that the memory 330 is non-movable. In certain examples, a non-transitory storage medium may store data that can, over time, change (e.g., in Random Access Memory (RAM) or cache).

Further, at least one of the plurality of modules/controller may be implemented through the AI model using a data driven controller. The data driven controller can be a ML model based controller and AI model based controller. A function associated with the AI model may be performed through the non-volatile memory, the volatile memory, and the processor 310. The processor 310 may include one or more processors. The one or more processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or more processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, a convolutional neural network (CNN), a recurrent convolutional neural network (RCNN), a deep neural network (DNN), recurrent neural network (RNN), a restricted Boltzmann Machine (RBM), a deep belief network (DBN), a bidirectional recurrent deep neural network (BRDNN), a generative adversarial networks (GAN), and a deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 3 shows various hardware components of the electronic device 300 but it is to be understood that other embodiments are not limited thereon. In other embodiments, the electronic device 300 may include less or more components. Further, the labels or names of the components are used only for illustrative purpose and does not limit the scope of the disclosure. One or more components can be combined together to perform same or substantially similar function in the electronic device 300.

Figure 4:
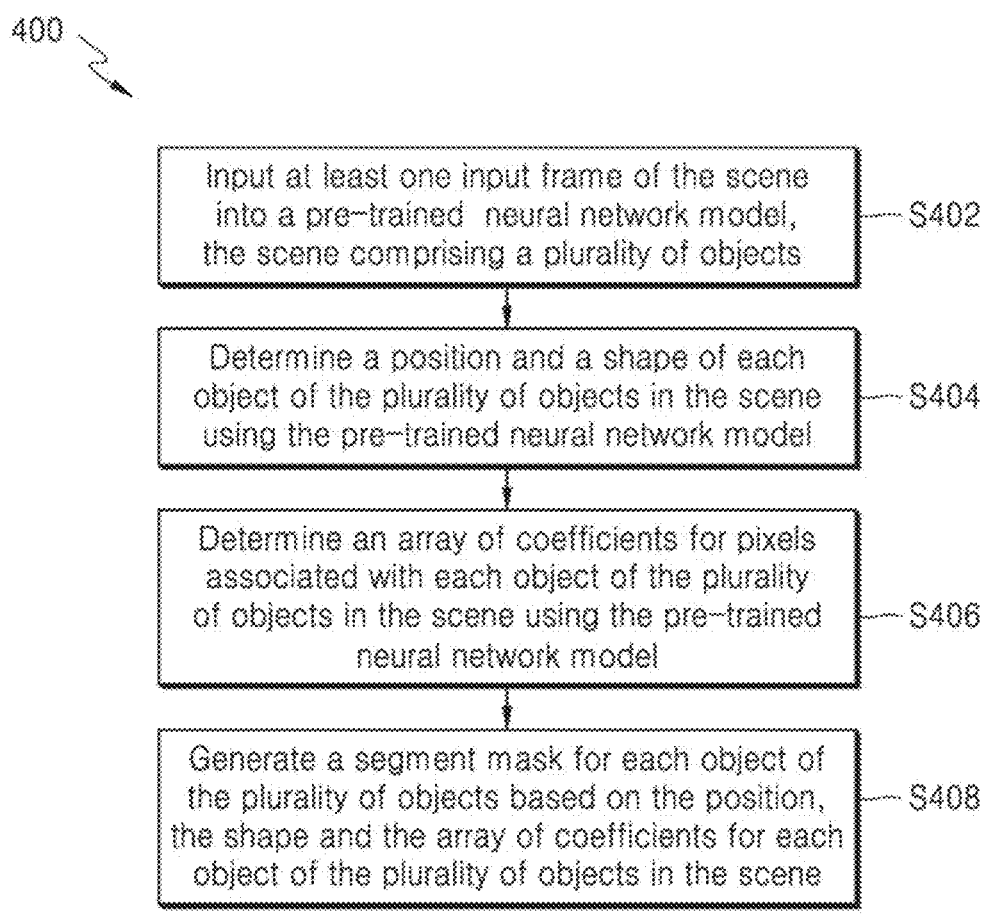
FIG. 4 is a flow chart illustrating a method for segmenting objects in a scene, according to an embodiment.

FIG. 4 is a flow chart S400) illustrating a method for segmenting objects in the scene by the electronic device 300, according to the embodiments as disclosed herein. The operations S402 to S408 are handled by the object segment controller 340.

At S402, the method includes inputting the at least one input frame of the scene comprising the plurality of objects into the pre-trained neural network model. At S404, the method includes determining the position and the shape of each object of the plurality of objects in the scene using the pre-trained neural network model. At S406, the method includes determining the array of coefficients for pixels associated with each object of the plurality of objects in the scene using the pre-trained neural network model. At S408, the method includes generating the segment mask for each object of the plurality of objects based on the position, the shape and the array of coefficients for each object of the plurality of objects in the scene.

The method can be used to achieve high quality segmentation for overlapping objects in the scene with less processing power and high accuracy.

The various operations, actions, acts, blocks, steps, or the like in the flow chart S400 may be performed in the order presented, in a different order or simultaneously. Further, in some embodiments, some of the actions, acts, blocks, steps, or the like may be omitted, added, modified, skipped, or the like without departing from the scope of the disclosure.

Figure 5:
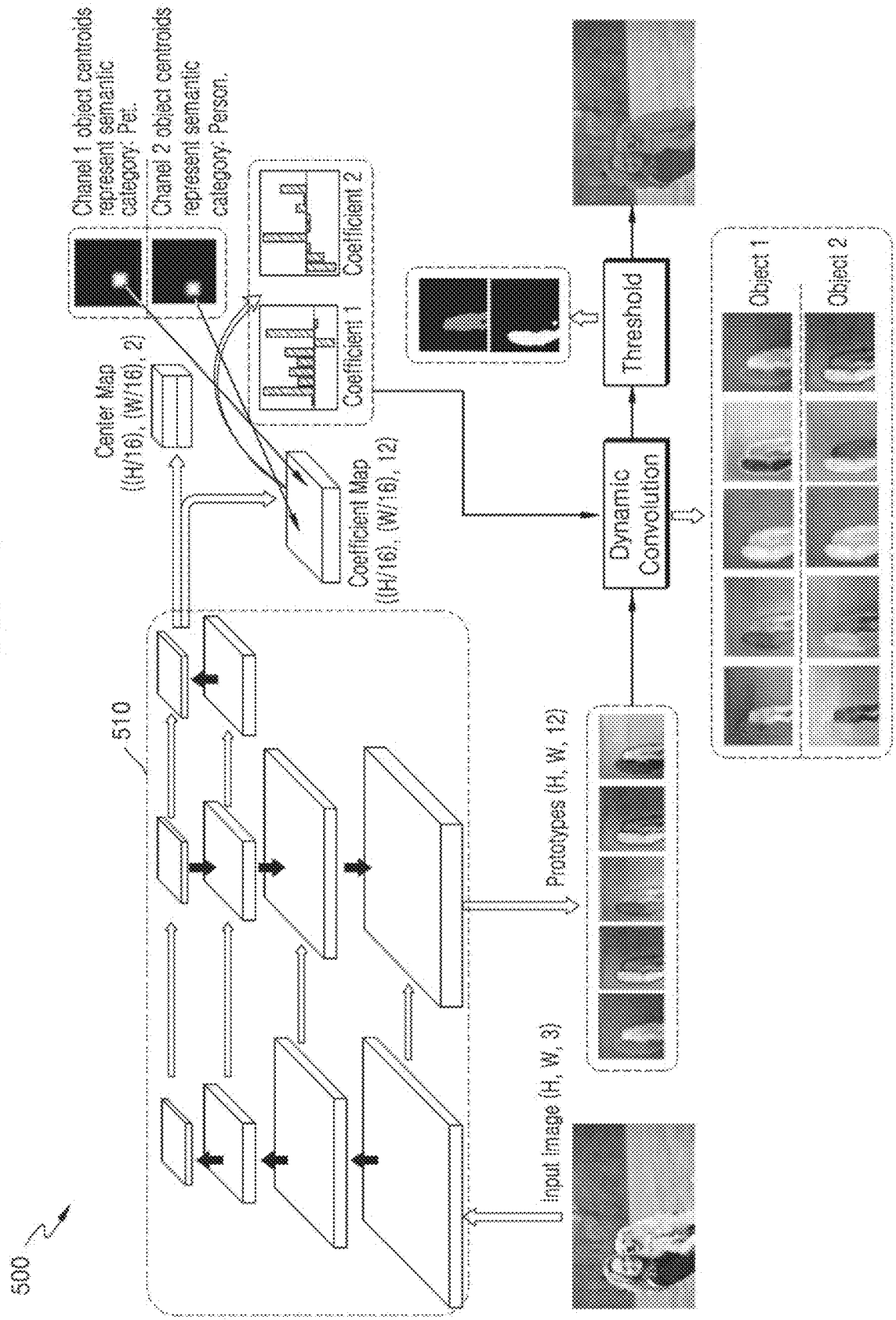
FIG. 5 and FIG. 6 are example scenarios in which a semantic aware center map is used to extract semantic category information, while segmenting objects in the scene, according to embodiments.
Figure 6:
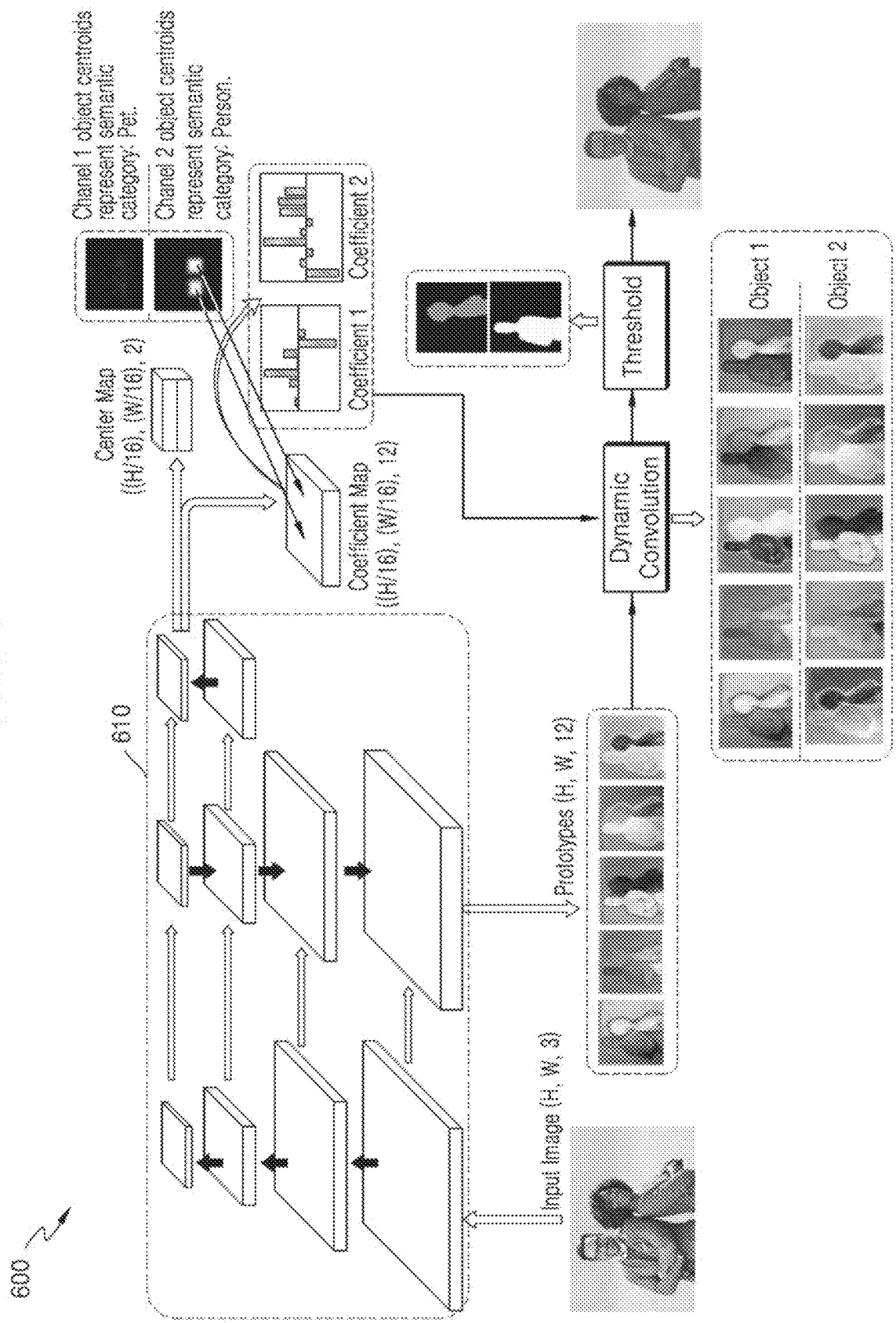

FIG. 5 and FIG. 6 are example scenarios 500 and 600 in which a semantic aware center map is used to extract semantic category information, while segmenting objects in the scene, according to the embodiments as disclosed herein.

In an example scenario 500 shown in FIG. 5, a semantic aware center map is used to extract semantic category information (Here, Person and Pet). For representation, the network is shown with 2 channel Center Map (Channel 1: Pet, Channel 2: Person), but it can be trained for more number of semantic categories. Since, Object 1 comes from Coefficient 1, which is obtained corresponding to center at channel 1, it is labelled semantic category Pet, and similarly Object 2 is assigned semantic category Person.

In an embodiment, neural network backbone 510 may receive an RGB image which has 3 channels. The neural network backbone 510 may output a prototype map, a coefficient map (it may also be referred to as an array of coefficients or a coefficient array.), and a center map. The prototype map may corresponding to a shape of each object in the image. The center map may correspond to a position of each object in the image.

In an embodiment, the center map may have 2 channels, of which channel 1 is processed first. There is one pet in the image, one maxima location corresponding to centroid of the pet is obtained. An object centroid of the channel 1 may represent semantic category: Pet. The values of coefficient map at the maxima location (for example, Coefficient 1) are extracted. This generates a coefficient array of 12 channels, which corresponds to the number of the channels of the prototype map. The 12 channels of the prototype map can be considered as 12 basis matrices of resolution (for example, (448, 448)). Each of these matrices is multiplied (or linearly combined) by the corresponding channel value of above coefficient array to generate 12 modified matrices of resolution (for example, (448, 448)), and this step may be referred to as Dynamic Convolution. The 12 modified matrices are summed to generate a single matrix of same resolution (for example, (448, 448)). The matrix generated at above step is thresholded to get binary segmentation mask of first object instance of semantic category Pet in this image, and this step may be referred to as Threshold.

Next, channel 2 of the center map is processed. There is one person in the image, one maxima location corresponding to centroid of the person is obtained. An object centroid of the channel 2 may represent semantic category: Person. The values of coefficient map at the maxima location (for example, Coefficient 2) are extracted. This generates a coefficient array of 12 channels, which corresponds to the number of the channels of the prototype map. The 12 channels of the prototype map can be considered as 12 basis matrices of resolution (for example, (448, 448)). Each of these matrices is multiplied by the corresponding channel value of above coefficient array to generate 12 modified matrices of resolution (for example, (448, 448)). The 12 modified matrices are summed to generate a single matrix of same resolution (for example, (448, 448)). The matrix generated at above step is thresholded to get binary segmentation mask of second object instance of semantic category Person in this image.

The pieces of thresholded data corresponding to channel 1 and 2 may be merged to obtain semantic mask for each instance in the image.

In an example scenario 600 shown in FIG. 6, the semantic aware center map is used to extract semantic category information (Here, Persons). For representation, the network is shown with 2 channel Center Map (Channel 0: Person 1, Channel 1: Person 2), but it can be trained for more number of semantic categories. Since, Object 1 comes from Coefficient 1, which is obtained corresponding to center at channel 2, it is labelled semantic category Person, and similarly Object 2 is assigned semantic category Person.

In an embodiment, neural network backbone 610 may receive an image. The neural network backbone 610 may output a prototype map, a coefficient map (it may also be referred to as an array of coefficients.), and a center map. The prototype map may corresponding to a shape of each object in the image. The center map may correspond to a position of each object in the image.

In an embodiment, the center map may have 2 channels, of which channel 1 is processed first. There is no pet in the image, so an object centroid for pet is not obtained.

Next, channel 2 of the center map is processed. There are two people in the image, two maxima locations corresponding to centroids of first person and second person is obtained. Object centroids of the channel 2 may represent semantic category: Person. The values of coefficient map at the maxima location (for example, Coefficient 1 and Coefficient 2) are extracted. This generates a coefficient array of 12 channels, which corresponds to the number of the channels of the prototype map. The 12 channels of the prototype map can be considered as 12 basis matrices of resolution (for example, (448, 448)). Each of these matrices is multiplied by the corresponding channel value of above coefficient array to generate 12 modified matrices of resolution (for example, (448, 448)). The 12 modified matrices are summed to generate a single matrix of same resolution (for example, (448, 448)). The matrix generated at above step is thresholded to get binary segmentation mask of second object instance of semantic category Person in this image.

Figure 7:
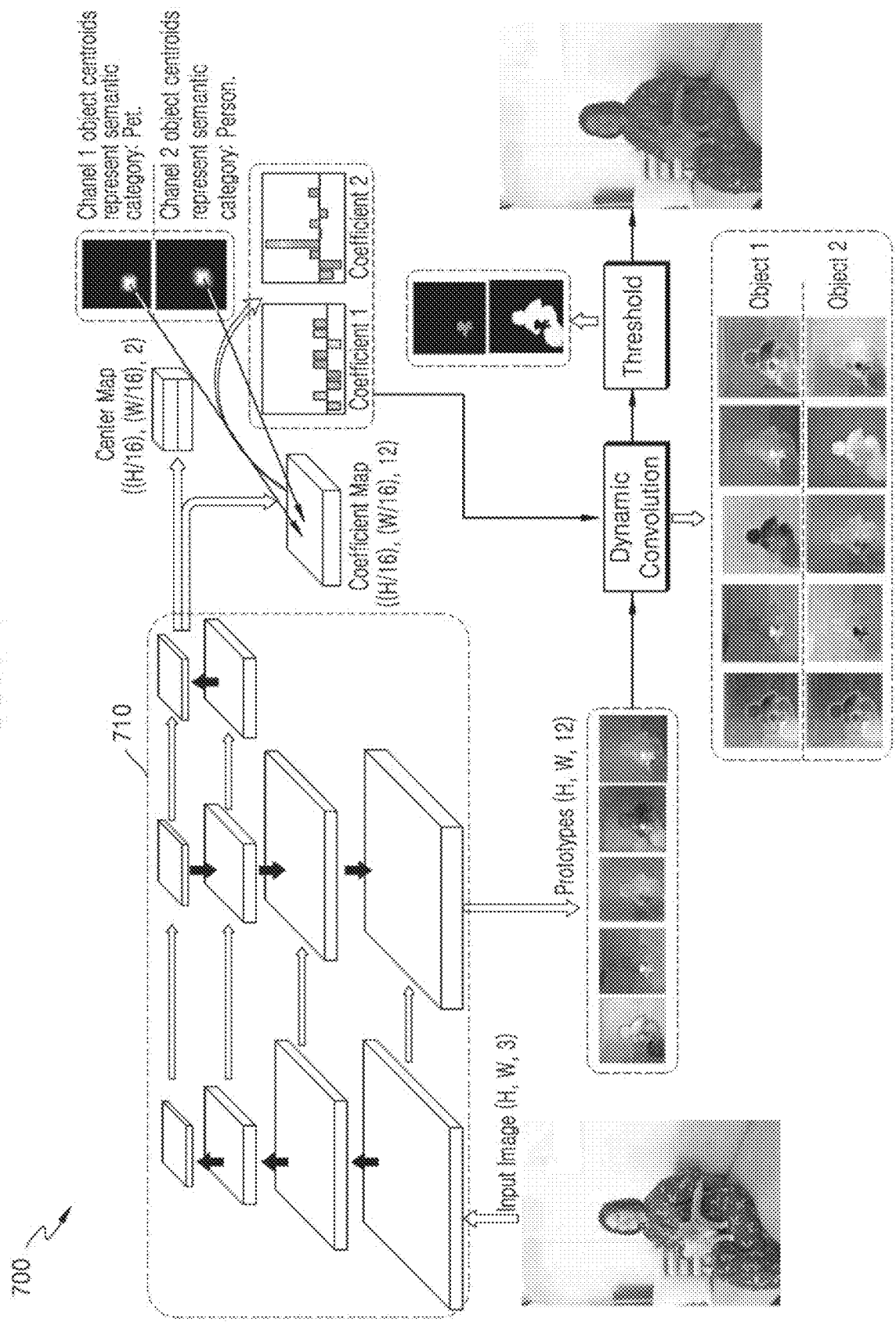
FIG. 7 is an example scenario in which overlapping objects scenario improved demarcation is depicted, according to an embodiment.

The thresholded data corresponding to channel 2 may be merged to obtain semantic mask for each instance in the image. FIG. 7 is an example scenario 700 in which overlapping objects scenario improved demarcation is depicted, according to the embodiments as disclosed herein. In an example, as shown in FIG. 7, the semantic aware center map is used to extract semantic category information (Here, Person and Pet). Since, the two centroids indicating objects originate from two different channels of the network, the two objects are efficiently captured by the network and the difference in heatmaps in prototypes output combined with the coefficient output give perfectly demarcated object instance segmentation.

In an embodiment, neural network backbone 710 may receive an image. The neural network backbone 710 may output a prototype map, a coefficient map (it may also be referred to as an array of coefficients.), and a center map. The prototype map may corresponding to a shape of each object in the image. The center map may correspond to a position of each object in the image.

In an embodiment, the center map may have 2 channels, of which channel 1 is processed first. There is one pet in the image, one maxima location corresponding to centroid of the pet is obtained. An object centroid of the channel 1 may represent semantic category: Pet. The values of coefficient map at the maxima location (for example, Coefficient 1) are extracted. This generates a coefficient array of 12 channels, which corresponds to the number of the channels of the prototype map. The 12 channels of the prototype map can be considered as 12 basis matrices of resolution (for example, (448, 448)). Each of these matrices is multiplied (or linearly combined) by the corresponding channel value of above coefficient array to generate 12 modified matrices of resolution (for example, (448, 448)), and this step may be referred to as Dynamic Convolution. The 12 modified matrices are summed to generate a single matrix of same resolution (for example, (448, 448)). The matrix generated at above step is thresholded to get binary segmentation mask of first object instance of semantic category Pet in this image, and this step may be referred to as Threshold.

Next, channel 2 of the center map is processed. There is one person in the image, one maxima location corresponding to centroid of the person is obtained. An object centroid of the channel 2 may represent semantic category: Person. The values of coefficient map at the maxima location (for example, Coefficient 2) are extracted. This generates a coefficient array of 12 channels, which corresponds to the number of the channels of the prototype map. The 12 channels of the prototype map can be considered as 12 basis matrices of resolution (for example, (448, 448)). Each of these matrices is multiplied by the corresponding channel value of above coefficient array to generate 12 modified matrices of resolution (for example, (448, 448)). The 12 modified matrices are summed to generate a single matrix of same resolution (for example, (448, 448)). The matrix generated at above step is thresholded to get binary segmentation mask of second object instance of semantic category Person in this image.

The pieces of thresholded data corresponding to channel 1 and 2 may be merged to obtain semantic mask for each instance in the image.

According to the FIGS. 5 to 7, 2 channels of the center map and 12 channels of the coefficient map and the prototype map are illustrated, but the number of channels of the maps is not limited thereto in the present disclosure.

FIG. 8A to FIG. 11B are example scenarios (800a-1100b) in which various result compared to a cascaded/two stage segmentation network with a proposed method, according to the embodiments as disclosed herein.

Figure 8A:
FIG. 8A to FIG. 11B are example scenarios in which various result compared to a cascaded/two stage segmentation network with a proposed method, according to embodiments.
Figure 8B:
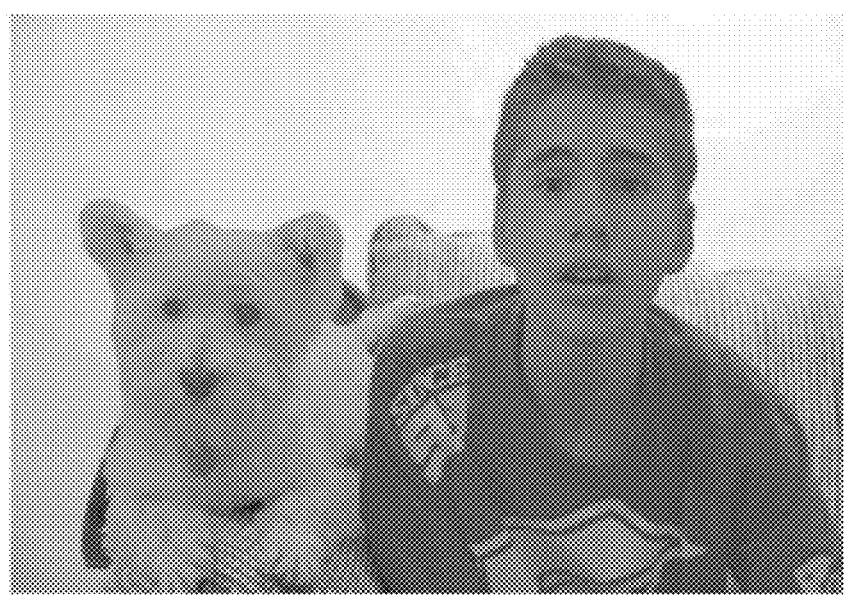
Figure 9A:
Figure 9B:
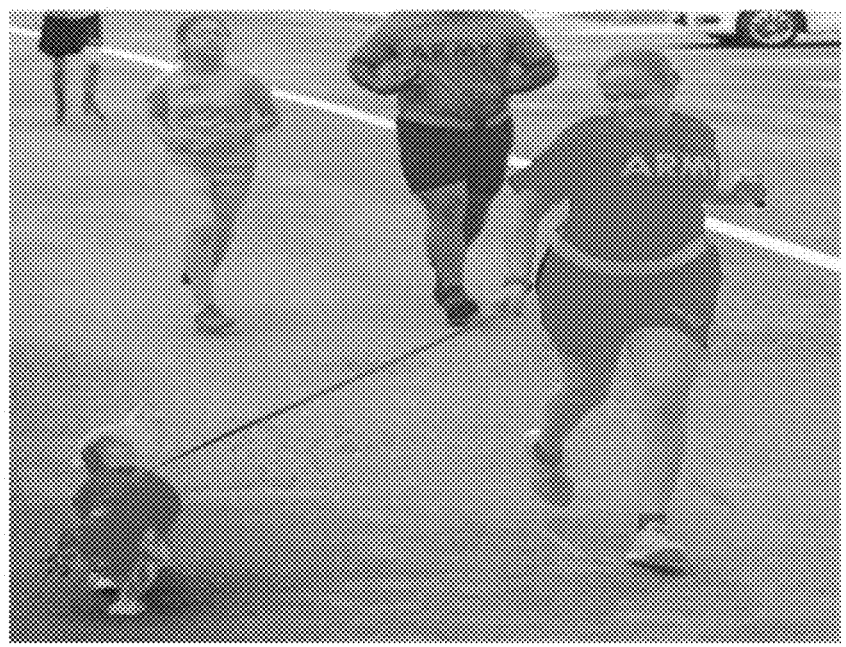
Figure 10A:
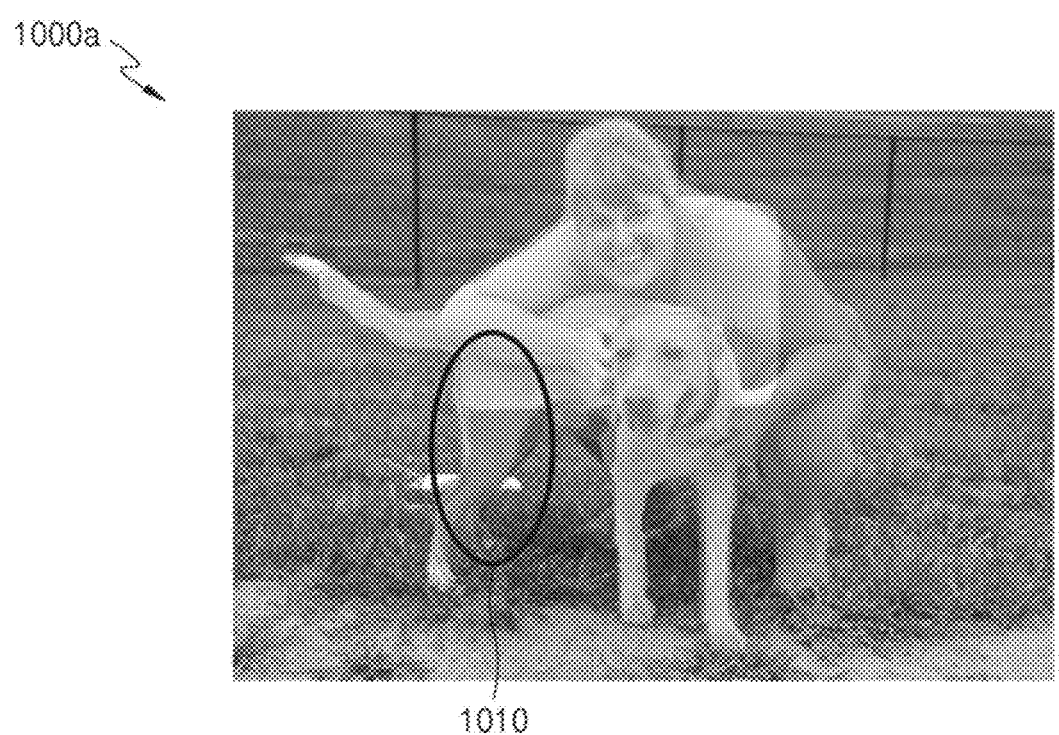
Figure 10B:
Figure 11A:
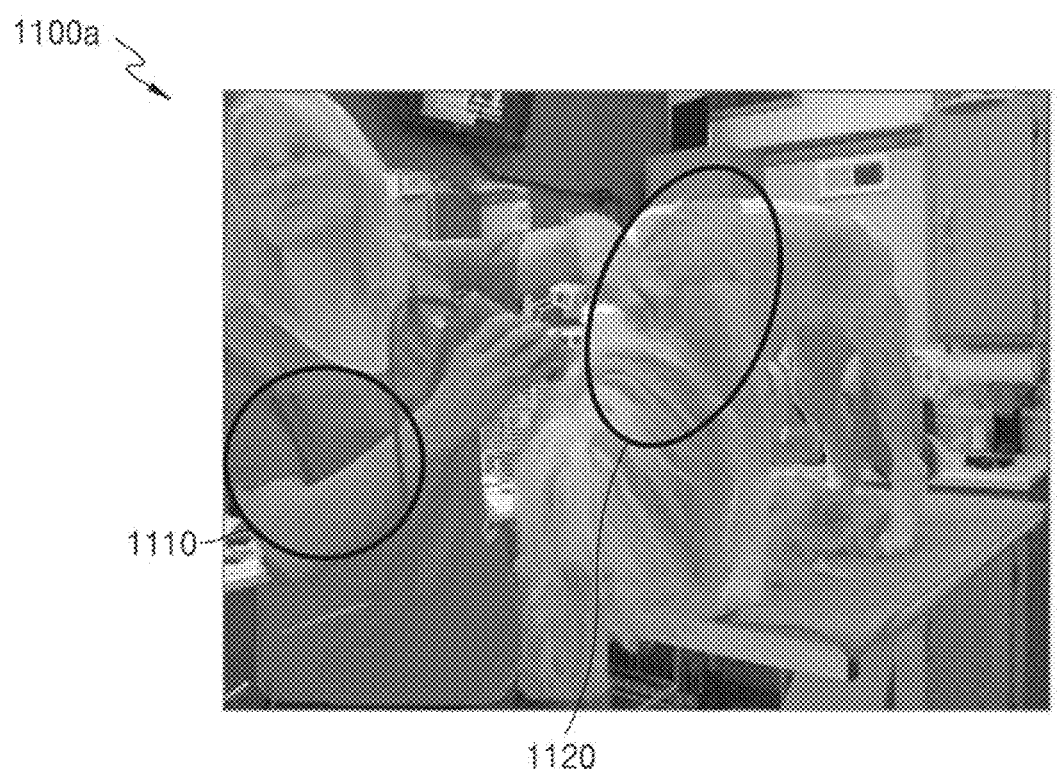
Figure 11B:

As shown in the example scenarios 800a of FIGS. 8A and 900a of FIG. 9A, the Mask RCNN, in example, is able to distinguish the present objects but has boundary issues shown as circles 810, 910. As shown in the example scenarios 1000a of FIGS. 10A and 1100a of FIG. 11A, the Mask-RCNN fails to distinguish the object of interest properly shown as circles 1010, 1110, 1120, whereas, as shown in the example scenario 800b of FIG. 8B, 900b of FIG. 9B, 1000b of FIGS. 10B and 1100b of FIG. 11B, the method can be used to improved result compared to the cascaded/two stage segmentation network (e.g., Mask-RCNN).

Figure 12:
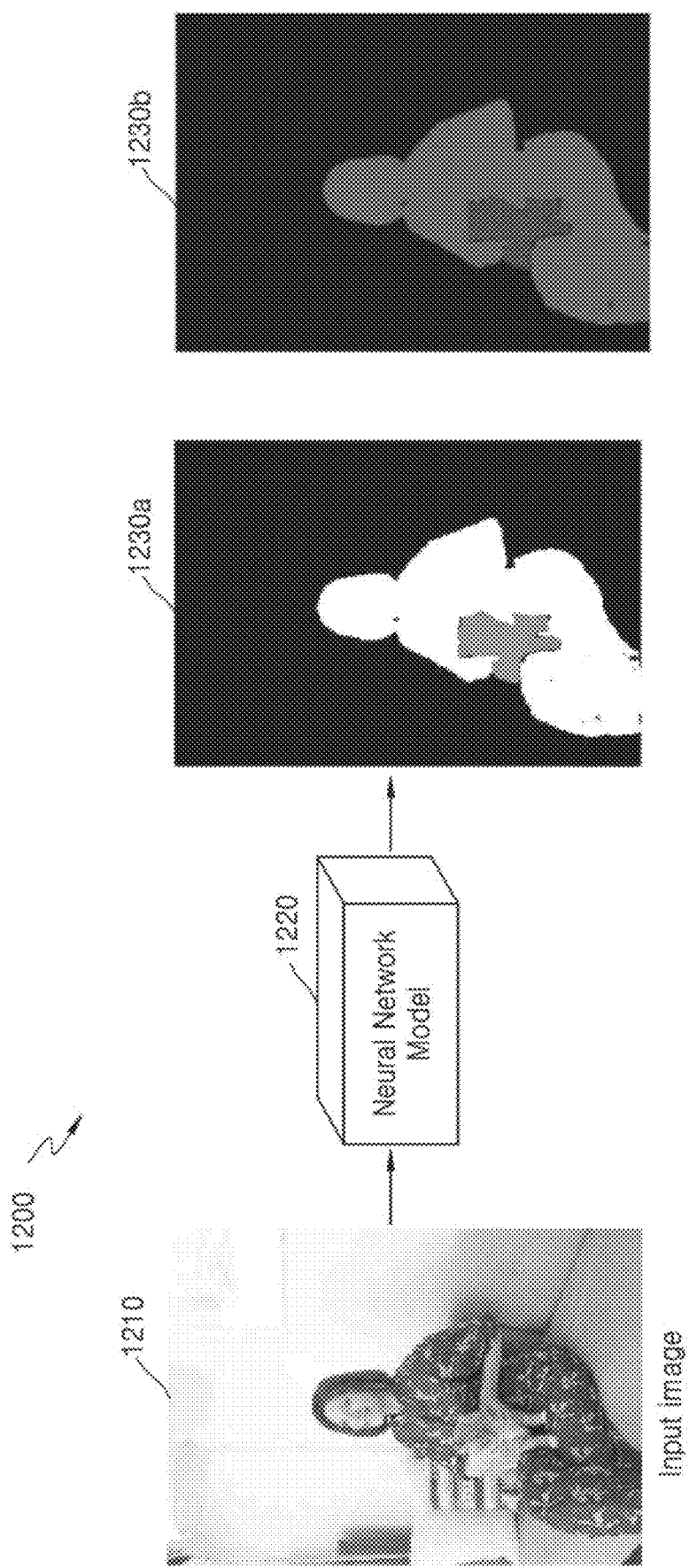
FIG. 12 is an example scenario in which segmentation mask generation process is depicted, according to an embodiment.

FIG. 12 is an example scenario 1200 in which segmentation mask generation process is depicted, according to the embodiments as disclosed herein. The user of the electronic device 300 of FIG. 3 considers the image (as shown in FIG. 12) to explain the segmentation mask generation process. For simplicity, the user of the electronic device 300 of FIG. 3 will consider the neural network model 1220 supports two semantic categories: Person and Pet.

The input image 1210 is passed through the neural network model 1220 to produce the object instance map 1230a and semantic segmentation map 1230b. Person is shown in gray color and Pet in dark gray color in the semantic segmentation map 1230b.

Input to Network: Input RGB image is resized to a resolution of (448, 448) to generate final input RGB image of resolution (448, 448, 3).

Output From Network: Prototypes (448, 448, 12), Center Map (28, 28, 2), Coefficient Map (28, 28, 12)

Mask Generation Steps: Center Map has two channels, of which channel 0 is processed first. Corresponding mask has category: Pet.

Locations of maxima in channel 0 are extracted. Since, there is one pet in the image, one maxima location corresponding to a centroid of the pet is obtained.

The values of coefficient map at the above maxima location are extracted. This generates a coefficient array of 12 channels. The 12 channels of prototypes can be considered as 12 basis matrices of resolution (448, 448). Each of these matrices is multiplied by the corresponding channel value of above coefficient array to generate 12 modified matrices of resolution (448, 448). The 12 modified matrices are summed to generate a single matrix of same resolution (448, 448).

The generated matrix is thresholded to get binary segmentation mask of first object instance of semantic category Pet in this image. Next channel 1 is processed. Corresponding mask has category: Person.

Locations of maxima in channel 1 are extracted. Since, there is one person in the image, one maxima location corresponding to a centroid of the person is obtained. The values of Coefficient Map at the above maxima location are extracted. This generates a coefficient array of 12 channels. Again, each of the 12 matrix components of Prototypes of resolution (448, 448) is multiplied by the corresponding channel value of above coefficient array to generate 12 modified matrices of resolution (448, 448).

The 12 modified matrices are summed to generate a single matrix of same resolution (448, 448). The generated matrix is thresholded to get binary segmentation mask of second object instance of semantic category Person in this image.

To combine the result map of Step 2 with Step 1, the background regions of segmentation mask at Step 1 are filled with foreground regions of segmentation mask at Step 2. This way, the predicted mask region for Pet is maintained, and the spillover of predicted mask of Person into Pet region, if any, is protected. This results in the final instance as well as semantic (Person-Pet) segmentation mask.

The foregoing description of the example embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the disclosure has been described in terms of example embodiments, those skilled in the art will recognize that the embodiments herein can be practiced with modification within the scope of the embodiments as described herein.

Provided is a method for segmenting objects in a scene by an electronic device. The method may be used to provide a light weight instance segmentation with improved demarcation.

According to one or more embodiments, the method may generate a semantic aware position information and approximate shape information of objects present in the scene from a deep neural network and combine the position and shape information intelligently to produce good quality real-time instance segmentation of objects present in the scene while maintaining power and memory consumption in the electronic device.

What is claimed is:

1. A method for segmenting objects in a scene by an electronic device, the method comprising:
   inputting at least one input frame of the scene into a pre-trained neural network model, the scene comprising a plurality of objects;
   determining a position and a shape of each object of the plurality of objects in the scene using the pre-trained neural network model;
   determining an array of coefficients for pixels associated with each object of the plurality of objects in the scene using the pre-trained neural network model; and
   generating a segment mask for each object of the plurality of objects based on the position, the shape, and the array of coefficients for each object of the plurality of objects in the scene,
   wherein the generating the segment mask for each object of the plurality of objects comprises:
   obtaining semantically aware center maps and shape aware prototype masks associated with each object of the plurality of objects in the scene,
   determining a linear combination of the semantically aware center maps and the shape aware prototype masks weighted by corresponding coefficients of the array of coefficients on each center location, and
   generating the segment mask for each object of the plurality of objects based on the linear combination of the semantically aware center maps and the shape aware prototype masks.

2. The method of claim 1, wherein the method further comprises displaying the segment mask for each object in the scene that segments overlapping objects of the plurality of objects in the scene.

3. The method of claim 1, wherein the determining the position of each object of the plurality of objects in the scene using the pre-trained neural network model comprises:
   generating a center map using the pre-trained neural network model, wherein the center map comprises N channels that corresponds to a number of semantic categories representing each object in the scene; and
   determining the position of each object of the plurality of objects in the scene based on the center map.

4. The method of claim 3, wherein the generating the center map comprises:
   inputting the at least one input frame of the scene to the pre-trained neural network model and obtaining an N channel feature map as an output from the pre-trained neural network model, wherein N corresponds to a number of semantic categories that are supported; and
   obtaining the center map by predicting, based on the N channel feature map, center positions of each object of the plurality of objects in the at least one input frame input to the pre-trained neural network model.

5. The method of claim 4, wherein the predicting the center positions of each object of the plurality of objects comprises:
   locating a local maxima by suppressing local minimum areas and capturing only local maximums for each channel of the N channel feature map, wherein the location of the local maxima in each channel of the N channel feature map corresponds to centroid positions of the plurality of objects of that semantic category forming the center map.

6. The method of claim 3, wherein the determining the position of each object of the plurality of objects in the scene from the center map comprises:
   reshaping the at least one input frame by pre-processing the at least one input frame based on neural network input parameters, wherein the neural network input parameters comprise at least one of a channel dimension of input frame, a spatial resolution of input frame, and processing details;
   inputting the reshaped at least one input frame into a pyramidal based neural network model to generate a set of features from pyramid levels;
   combining the set of features from the pyramid levels to form aggregated features;
   passing the aggregated features through a center mask to generate semantically aware center map of shape of each object of the plurality of objects in the scene; and
   determining, based on the semantically aware center map, the position of each object of the plurality of objects in the scene by encoding a confidence of each position having a center of an object for each semantic category of the semantic categories.

7. The method of claim 1, wherein the determining the shape of each object of the plurality of objects in the scene using the pre-trained neural network model comprises:
   generating a prototype map using the pre-trained neural network model, wherein the prototype map produces a fixed number of object shape aware feature maps, which act as prototypes for final object instances; and
   determining the position of each object of the plurality of objects in the scene from the prototype map.

8. The method of claim 7, wherein the determining the position of each object of the plurality of objects in the scene from the prototype map comprises:
   reshaping by pre-processing the at least one input frame based on neural network input parameters;

inputting the reshaped at least one input frame into a pyramidal based neural network model to generate a set of features from pyramid levels;

combining, the set of features from the pyramid levels to form aggregated features; and determining the position of each object of the plurality of objects in the scene by passing the aggregated features through a prototype mask to generate a plurality of shape aware prototype masks for each center in the at least one input frame.

9. The method of claim 1, wherein the determining the array of coefficients for pixels associated with each object of the plurality of objects in the scene using the pre-trained neural network model comprises:

determining a first array of coefficients for a first object of the plurality of objects in the scene; and determining a second array of coefficients for a second object of the plurality of objects in the scene.

10. The method of claim 1, wherein the inputting the at least one input frame of the scene into the pre-trained neural network model comprises:

displaying the scene in a preview field of at least one imaging sensor of the electronic device;

obtaining the at least one input frame of the scene using the at least one imaging sensor; and inputting the at least one input frame of the scene into the pre-trained neural network model.

11. An electronic device for segmenting objects in a scene, the electronic device comprising:

a memory;

a display;

an object segment controller communicatively coupled to the memory; and a processor configured to:

input at least one input frame of the scene into a pre-trained neural network model, the scene comprising a plurality of objects;

determine a position and a shape of each object of the plurality of objects in the scene using the pre-trained neural network model;

determine an array of coefficients for pixels associated with each object of the plurality of objects in the scene using the pre-trained neural network model; and generate a segment mask for each object of the plurality of objects based on the position, the shape, and the array of coefficients for each object of the plurality of objects in the scene, wherein the processor is further configured to:

obtain semantically aware center maps and shape aware prototype masks associated with each object of the plurality of objects in the scene, determine a linear combination of the semantically aware center maps and the shape aware prototype masks weighted by corresponding coefficients of the array of coefficients on each center location, and generate the segment mask for each object of the plurality of objects based on the linear combination of the semantically aware center maps and the shape aware prototype masks.

12. The electronic device of claim 11, wherein the processor is further configured to:

generate a center map using the pre-trained neural network model, wherein the center map includes N channels that corresponds to a number of semantic categories representing each object in the scene; and determine the position of each object of the plurality of objects in the scene based on the center map.

13. The electronic device of claim 12, wherein the processor is further configured to:

input the at least one input frame of the scene to the pre-trained neural network model and obtaining an N channel feature map as an output from the pre-trained neural network model, wherein N corresponds to a number of semantic categories that are supported; and obtain the center map by predicting center positions of each object of the plurality of objects in the at least one input frame input to the pre-trained neural network model based on the N channel feature map.

14. The electronic device of claim 13, wherein the processor is further configured to predict the center positions of each object of the plurality of objects by locating a local maxima by suppressing local minimum areas and capturing only local maximums for each channel of the N channel feature map, wherein the location of the local maxima in each channel of the N channel feature map corresponds to centroid positions of the plurality of objects of that semantic category forming the center map.

15. The electronic device of claim 12, wherein the processor is further configured to:

reshape the at least one input frame by pre-processing the at least one input frame based on neural network input parameters, wherein the neural network input parameters comprise at least one of a channel dimension of input frame, a spatial resolution of input frame, and processing details;

input the reshaped at least one input frame into a pyramidal based neural network model to generate a set of features from various pyramid levels;

combine the set of features from the various pyramid levels to form aggregated features;

pass the aggregated features through a center mask to generate semantically aware center map of shape of each object of the plurality of objects in the scene; and determine the position of each object of the plurality of objects in the scene by encoding a confidence of each position having a center of an object for each semantic category of the number of semantic categories based on the center map.

16. The electronic device of claim 11, wherein the processor is further configured to:

generate a prototype map using the pre-trained neural network model, wherein the prototype map produces a fixed number of object shape aware feature maps, which act as prototypes for final object instances; and determine the position of each object of the plurality of objects in the scene from the prototype map.

17. The electronic device of claim 11, wherein the processor is further configured to:

determine a first array of coefficients for a first object of the plurality of objects in the scene; and determine a second array of coefficients for a second object of the plurality of objects in the scene.

18. A non-transitory computer readable medium containing instructions, wherein when the instructions are executed by at least one processor, the instructions cause the at least one processor to:

input at least one input frame of the scene into a pre-trained neural network model, the scene comprising a plurality of objects;

determine a position and a shape of each object of the plurality of objects in the scene using the pre-trained neural network model;

determine an array of coefficients for pixels associated with each object of the plurality of objects in the scene using the pre-trained neural network model; and generate a segment mask for each object of the plurality of objects based on the position, the shape, and the array of coefficients for each object of the plurality of objects in the scene, wherein when the instructions are executed by at least one processor, the instructions cause the at least one processor to:

obtain semantically aware center maps and shape aware prototype masks associated with each object of the plurality of objects in the scene, determine a linear combination of the semantically aware center maps and the shape aware prototype masks weighted by corresponding coefficients of the array of coefficients on each center location, and generate the segment mask for each object of the plurality of objects based on the linear combination of the semantically aware center maps and the shape aware prototype masks.

\* \* \* \* \*